United States Patent
Ames et al.

(10) Patent No.: US 6,635,298 B2
(45) Date of Patent: Oct. 21, 2003

(54) METHOD OF PREPARING TORTILLAS FROM WAXY BARLEY CULTIVARS

(75) Inventors: Nancy Ames, Winnipeg (CA); Elaine J. Sopiwnyk, Winnipeg (CA); Mario Therrien, Brandon (CA)

(73) Assignee: Her Majesty the Queen in right of Canada, as represented by the Department of Agriculture & Agri Food, Winnipeg (CA)

( * ) Notice: Subject to any disclaimer, the term of this patent is extended or adjusted under 35 U.S.C. 154(b) by 0 days.

(21) Appl. No.: 09/866,518

(22) Filed: May 29, 2001

(65) Prior Publication Data

US 2002/0018835 A1 Feb. 14, 2002

Related U.S. Application Data

(60) Provisional application No. 60/207,346, filed on May 30, 2000.

(51) Int. Cl.[7] ............................................... A21D 13/00
(52) U.S. Cl. .................... 426/549; 426/94; 426/138; 426/808
(58) Field of Search ................................. 426/549, 138, 426/94, 622, 808

(56) References Cited

PUBLICATIONS

P. T. Berglund, C. E. Fastnaught and E. T. Holm, "Food Uses of Waxy Hull–less Barley", Sep. 1992, *Cereal Foods World* 37: 709–714.

Artur P. Klamczynski and Zuzanna Czuchajowska, "Quality of Flours from Waxy and Nonwaxy Barley for Production of Baked Products", Apr., 1999, *Cereal Chemistry* 76: 530–535.

Mitre–Diestre, C.M., Ames, N.P., Rooney, L.W. and Waniska, R.D. 2001. Effect of amulose and –glucan content on barley tortilla properties. Tortilla Industry Association Technology Meeting. Los Angeles, California, May 2001.

Sopiwnyk, E., Ames, N., Therrien, M. 1999. Physicochemical properties of starches from Chinese barley cultivars. AACC Annual Meeting. Seattle, Washington. Oct. 31–Nov. 3, 1999.

Ames, N., Sopiwnyk, E. and Therrien, M. 2000. Composition and textural properties of barley tortillas. Agri–Food 2000 CIFST Poster Session. Winnipeg, MB. Jul. 15–19, 2000.

Ames, N., Sopiwnyk, E. and Therrien, M. 2000. Properties of Tortillas Made from Canadian and Asian Barley Cultivars. Dietary Fibre Conference 2000. Dublin, Ireland. May 13–17, 2000.

Barley's future waxes brighter. News article by Karl Kessler. In. The Furrow. Mar. 2000.

Chemist goes against the grain by creating real 'barley sandwich'. News article by Randy Boswell. In: The Ottowa Citizen. Dec. 6, 2000.

Barley makes good tortilla. News article by Andrea Geary. In: The Western Producer. Apr. 27, 2000.

A new niche for barley? News article by Lorraine Stevenson. In: The Manitoba Co–operator. Apr. 6, 2000.

Tortillas could be boom market by barley. News article. In: Western Grains Research Foundation Report. Feb. 1, 2000.

*Primary Examiner*—Lien Tran
(74) *Attorney, Agent, or Firm*—Michael R. Williams; Ryan W. Dupuis; Adrian D. Battison

(57) ABSTRACT

Flour tortillas (i.e. soft tacos and tortillas, wraps, flatbreads) with improved texture and nutritional characteristics represent novel food products that can be processed using flour milled from specific barley cultivars (barley cultivars with waxy starch characteristics and high levels of fibre) as the flour source and with modifications to the die-cut or hot press tortilla methods. Tortilla chips (i.e. taco chips, sopapillas) also produced from specific types of barley flour using the previously described methods can be baked or fried. Barley tortillas and chips can also be produced from barley masa which is produced by cooking and steeping waxy barley in an alkali solution (nixtamalization).

11 Claims, No Drawings

METHOD OF PREPARING TORTILLAS FROM WAXY BARLEY CULTIVARS

This application claims priority under 35 USC §119(e) to Provisional patent application Ser. No. 60/207,346 filed on May 30, 2000.

FIELD OF THE INVENTION

The present invention relates to a method for making thin, non-yeast leavened food products from waxy barley cultivars.

BACKGROUND OF THE INVENTION

With growing consumer demands for foods with improved nutritional value, barley is gaining renewed interest as a food crop. Barley contains several components, most notably βglucan, dietary fibre, and tocopherols which have been reported to have desirable healthful benefits. Recommendations to consume high fibre, high complex carbohydrate diets in order to reduce cholesterol levels could be achieved through the consumption of barley based food products.

However, when barley flour is used to fully or partially replace wheat flour in many cereal based food products, undesirable effects in the final product are often observed. These undesirable effects often include problems with product texture (increased gumminess) and product colour. For example, Berglund et al (Berglund et al, 1992, *Cereal Foods World* 37:707–714) found poor product volume and color in pan bread (26% barley flour) and muffins (70% barley flour) and poor color in spice bars (100% barley flour). Similarly, Klamczynski and Czuchajowska (Klamczynski and Czuchajowska, 1999, *Cereal Chem* 76:530–535) observed poor volume in quick breads made from either 20% waxy or nonwaxy barley flour with 80% wheat flour. This is because properties such as high β-glucan, fibre and water absorption and low gluten and amylose may negatively affect processing and textural quality in some food products. As discussed herein, these properties may in fact be beneficial for production of thin, non-yeast leavened food products, for example, tortillas, tacos, chips and the like.

SUMMARY OF THE INVENTION

It is therefore an object of the invention to provide thin, non-yeast leavened food products made from barley flour from barley cultivars with waxy starch properties.

According to an aspect of the invention, there is provided a method of producing a non-yeast leavened product comprising: providing a quantity of barley flour from a barley cultivar having low (<10%) amylose content; combining the barley flour with other ingredients to produce dough; and preparing the thin, non-yeast leavened food product from the dough.

The barley cultivar may be selected from the group consisting of CDC Alamo, Shina Waju, CDC Candle, SB 94917 and SB 93977. As will be apparent to one knowledgeable in the art, other low amylose cultivars are also suitable.

The barley flour may be milled flour.

DESCRIPTION OF THE PREFERRED EMBODIMENTS

Unless defined otherwise, all technical and scientific terms used herein have the same meaning as commonly understood by one of ordinary skill in the art to which the invention belongs. Although any methods and materials similar or equivalent to those described herein can be used in the practice or testing of the present invention, the preferred methods and materials are now described. All publications mentioned hereunder are incorporated herein by reference.

Definitions

As used herein, the term "non-yeast leavened product" refers to food products such as, for example, wraps, tortillas, tacos, chips, pitas and chapatis.

Herein, the terms "cultivar" and "variety" are used interchangeably.

As used herein, "waxy barley cultivar" refers to barley cultivars having low amylose content. Specifically, the amylose content may be less than 20%. In other embodiments, the amylose content may be less than 15%. In yet other embodiments, the amylose content may be less than 10%.

As discussed above, addition of barley flour often produces undesirable changes to product texture. This is a result of the high β-glucan, fibre and water absorption properties of the barley flour. However, as discussed herein, these properties which discourage the use of barley flour for many food applications as discussed above make barley flour surprisingly well suited for use in making dough for use in thin, non-yeast leavened food products.

For example, tortillas are the fastest growing market in the baking industry (Tortilla Industry Association, 2000), as markets for tortillas and wrap-style products are increasing in both North American and Europe as a result of the development of flavored tortillas and increased advertising and consumer acceptance. As well, snack food products such as tortilla chips, either baked or fried, are also popular. Flour tortillas are traditionally made using wheat flour in combination with water, salt and shortening. Good quality flour tortillas are flexible and roll without cracking or tearing, whereas poor quality tortillas are inflexible and crack when rolled. Tortillas and chips are traditionally produced from wheat flour or masa (from corn). As discussed below, flour tortillas made from waxy, high β-glucan barley cultivars show increased flexibility compared to wheat flour based tortillas which are non-waxy and do not contain β-glucan.

Production of flour tortillas and tortilla chips made from barley flour which is milled from barley cultivars with low to zero amylose starch (also known as waxy barley) and with high β-glucan and dietary fibre contents, as the sole or primary flour constituent, may satisfy consumer demands for more healthful and innovative food products. In some embodiments, the flour of the food product may be at least 50% waxy barley flour. In other embodiments, it may be at least 75% waxy barley flour or at least 90% waxy barley flour. In yet other embodiments, 100% waxy barley flour is used. In other embodiments, waxy barley flour is used as an added ingredient, as discussed below. As will be apparent, the amylose content of these flour mixtures will vary according to the amylose content of the non-waxy barley flour component. As discussed above, the starch of waxy barley cultivars is comprised primarily of amylopectin, the branched chain polymer of glucose, and very little amylose, the linear polymer of glucose. It is of note that tortillas with increased flexibility can only be made from barley cultivars with waxy starch properties. Both barley flour or masa, produced from steeping barley in an alkali solution (nixtamalization), can be used for production of tortillas and chips, as discussed below. Examples of other non-yeast leavened products include, but are by no means limited to, for example, pitas and chapatis.

As shown in Table 1, 29 barley cultivars were evaluated. Starch was extracted from coarsely ground grain and was used to characterize gelatinization properties using differential scanning calorimetry (DSC), amylose content, β-glucan content and total dietary fibre content. Tortillas were processed and assessed for tortilla breaking force as described below.

As can be seen in Table 1, significant variation in β-glucan and dietary fibre contents as well as starch properties (amylose content, SSV (starch swelling volume) and starch thermal properties as measured by DSC) were observed for most of the cultivars. Specifically, barley cultivars with waxy starch properties were observed to have low amylose content, high SSV and low enthalpy values (for the amylose-lipid complex). Specifically, amylose content varied from 0% to 41.2%. For example, Shina Waju, CDC Alamo, CDC Candle, SB 94917 and SB 93977 were determined to have low amylose content (0% to 10%) and were therefore classified as waxy. It is of note however that any barley cultivars having low amylose, for example, Merlin, Waxbar and Meresse, are likely to be suitable for the uses described herein. Furthermore, it is of note that significant differences in enthalpy of the gelatinization curve were observed using the DSC. Specifically, lower enthalpy values were observed for the waxy cultivars. This suggests that waxy types of barley have measurable differences in starch gelatinisation which can be examined by an instrumental technique known as differential scanning calorimetry (DSC) which measures temperature and enthalpy of gelatinisation. This in turn suggests that there are specific measurable thermal starch characteristics in addition to amylose content which are associated with the "waxy" varieties. Textural differences were observed and were greatly affected by amylose content. Specifically, increased tortilla breaking force and extensibility values were observed in cultivars with waxy starch properties. As such, these cultivars were found to have the desired properties that would make them well suited for the production of tortilla or wrap products where increased flexibility is important.

Evaluation of Textural Properties of Barley Tortillas

Tortilla extensibility was evaluated using the TA.XT2 Texture Analyzer™ (Texture Technologies, Scarsdale, N.Y., USA) with the tortilla rig (TA-108 and TA-108A, 7/16Δ diameter, Texture Technologies, Scarsdale, N.Y. USA). In this procedure, a whole tortilla is clamped in the tortilla rig and the probe travels through the tortilla and measures the extensibility. Tortillas with higher extensibility values are more desirable since they can be rolled without tearing or cracking. As can be seen in Table 1, tortillas with greater extensibility (i.e.—tortilla breaking force) were produced from barley cultivars with low amylose content (waxy starch properties), high SSV (starch swelling volume), high β-glucan content and low enthalpy values (for the amylose-lipid complex); tortillas produced from barley cultivars with high amylose (>35%) content or regular amylose (25–30%) content had less extensibility. Furthermore, barley tortillas made from waxy barley with higher levels of β-glucan and fibre will provide more dietary fibre and thus be considered more nutritious.

Flour Milling

Waxy barley flour can be produced from flour milled at various extraction rates (30–100%) using laboratory or commercial scale mills. Straight grade flour, with an average extraction rate of 40%, can be produced using a Buhler™ laboratory scale mill. Waxy barley flour with higher extraction rates (approximately 60%) can be produced using commercial milling equipment. Some losses of β-glucan and fibre occur as a result of milling, with greater losses occurring at lower extraction rates.

In other embodiments, the barley is milled into fractions of endosperm, bran, shorts, dusted bran and dusted shorts. The milling fractions are then combined to produce a flour having the desired characteristics. These desired characteristics may include but are by no means limited to specified extraction levels, specified levels of amylose, soluble fibre and insoluble fibre and specified water absorption requirements As will be apparent to one knowledgeable in the art, the extraction rates or levels refer to the various fractions of ground grain obtained during the milling process which consist of various anatomical and chemical components present in the kernel. In some embodiments, straight grade flour is mixed with portions of higher fibre flour obtained by further treatment of the bran and shorts. With this blending we are able to obtain various fibre levels in our flour. In other embodiments, the straight grade flour (we call this low extraction—30–40% depending on variety) is mixed with increasing levels of the outer portion of the kernel containing increasing levels of fibre and bran which we refer to as higher levels of extraction (e.g. 50–75%). In other embodiments, higher levels may include whole meal flour (100%).

Nixtamalization

Production of masa from barley is a similar process to the production of corn masa. Nixtamalization traditionally involves cooking corn in a mixture of lime and water just below the boiling point causing the kernel to absorb water and partial gelatinization of the starch. The length of time the corn is cooked in lime depends on the hardness of the kernels. The mixture is then steeped for a specified period of time (usually >10 hours) in order to reach the desired moisture content and to remove the pericarp. After steeping, the liquids (neyajote) are drained off and the resulting nixtamal is washed to remove loose pieces of pericarp and excess lime. The masa is then ground. Water can then be added to make a dough or the masa can be dried and then ground to produce masa flour. Optimization of the conditions during nixtamalization is important in order to reduce the amount of dry matter losses (nonstarch polysaccharides, starch, protein, and lipids) in the steep water. Since the production of masa makes use of the whole kernel/grain, losses of the outer endosperm layer due to flour milling are reduced.

As will be appreciated by one knowledgeable in the art, milled or ground barley prepared as described above or using other means known in the art may be used in any suitable application. In an exemplary example described herein, the barley flour is used to prepare tortillas and tortilla chips. However, the invention is not limited to the examples.

Tortilla Production

Tortillas, made from barley flour with waxy starch properties as the sole flour source, can be produced using the die-cut and/or hot press procedures known in the art with modifications. Using the die-cut procedure, waxy barley flour (50g, 14.0% moisture basis), salt (1.5%), baking powder (1.5%), vital wheat gluten (3%) and shortening (12%) are mixed for 2 minutes in the GRL™ mixer. In some recipes, the wheat gluten may be omitted and/or wheat flour may be added.

Water and ascorbic acid (1 ml of 25 ppm) are then added to give an absorption of 56% and mixed for an additional 3.5 minutes until a dough is formed. As will be appreciated by one knowledgeable in the art, the amount of water added is important to create the correct dough handling properties as well as the optimum texture and shelf stability properties of the end product. The amount of water added depends on the quality and quantity of fibre in the flour. For example, water absorption levels of 55 to 100% were found to be suitable depending on the extraction level of the flour.

After mixing, the dough is formed by hand into a ball, covered and allowed to rest at room temperature for 5 minutes. The dough is then divided and rounded by hand into 4 balls (approximately 21.5 g each), placed in a covered bowl and allowed to rest for 20 minutes in a humidity cabinet (37.5° C., 80% RH). After resting, each ball is lightly dusted with flour in preparation for sheeting. The dough ball is flattened by passing through a sheeter (CDR-100S™, Somerset Industries, Inc, North Bellerica, Mass., USA) and successively decreasing the thickness until the dough is 0.7 mm thick. A circle (10 cm diameter) is cut from the dough and then baked in an oven (gas-fired or impingement) or cooked in a fry pan (246° C., 45 seconds/side). Immediately after cooking the tortilla is placed in a plastic bag and loosely sealed.

In an alternative embodiment, the dough is proofed and then rolled into small ball shapes prior to compression with a hot press (as described below) which reduces the dough ball to a thin circular dough piece (1 to 3 mm thick) which is then immediately baked in a tiered gas oven or any other oven which bakes at a temperature from 360° F. to 500° F. which allows the tortilla product to bake thoroughly with uniform bubbling and without overcooking.

Using the hot press procedure, ingredients are mixed, the resultant dough is divided and rested as described previously. Dough balls are transferred, one at a time to the pre-heated hot press (Dough Pro 2000™, Proprocess Corporation, Paramount, Calif., USA) and then flattened using setting 4 (approximate thickness of 1.0 mm) for 5–10 seconds. The temperature of the hot press is set to 250° C. for the top plate and 200° C. for the bottom plate. The pressed dough can then be baked in a gas fired oven or an impingement oven (Impinger Countertop™, Lincoln Food Service Products, Inc., Fort Wayne, Id., USA) or cooked in an electric fry pan (as described previously). The temperature of the impingement oven is set to 232° C. and the tortillas spend 45 sec in the oven. The tortillas are placed in plastic bags immediately after cooking and the plastic bags are loosely sealed.

As will be apparent to one knowledgeable in the art, tortillas produced from waxy barley masa require sheeting the dough and using the processes described previously (die-cut and hot press). Chips and tacos can be produced from waxy barley flour or masa using the processes described previously (die-cut and hot press), however triangular pieces are cut from the dough using a cutter. The triangular pieces can then be baked in an oven (gas fired or air impingement) or deep-fried in oil.

For corn-type tortillas, the waxy barley flour may be combined with water, water plus 1% food grade lime or up to 5% corn masa (to mimic corn tortilla taste). The dough is cold sheeted to a thickness of 1 to 3 mm and then cut to a circular shape with a die or cold pressed into a circular shape using a tortilla press. The thin dough circles may then be pan fried on a flat grill or using a tortilla pan placed on a stove element or baked in a tiered gas oven, or any oven that will accommodate temperatures of greater than 600° F. (oven temperature may vary from 600 to 800° F.) and allow the tortilla to bake completely and uniformly without causing excessive puffing or overcooking.

For corn tortilla chips, barley bran or cracked grain or corn may be added to the dough prepared as described above. Oil may be added when the chips are to be fried. The baked tortilla triangle is deep fried in hot vegetable oil at temperatures of approximately 350° F. to 400° F. for enough time to create a crispy but not overcooked product which can be immediately salted or flavored and packaged.

It is of note that barley tortillas show better textural attributes (less breakage and more extensibility) after freezing for 1–2 weeks compared to corn tortillas. Furthermore, the β-glucan component remains stable after frying and freezing.

In other embodiments, corn masa could be blended with barley to make a tortilla that looks, tastes and smells like the traditional corn tortilla. Alternatively, specific extractions of barley flour could be added to corn to act as a nutritional or functional ingredient to improve the product without affecting the properties of the current product.

In yet other embodiments, barley flour may be mixed with wheat flour in varying quantities. In some embodiments, tortillas having at least 10% barley flour are made as described above. In other embodiments, the tortillas are at least 20% barley flour.

Production of food products made with barley may satisfy the demands for more healthful food products due to their β-glucan, dietary fibre and tocopherol contents. In addition, it may satisfy consumer demands for new and innovative food products.

In other embodiments, cultivars with low to zero levels of amylose may be combined with barley or wheat cultivars containing average levels of amylose prior to milling or flour therefrom may be combined to produce end products having the optimum functionality consistent with that produced using the low amylose cultivars alone.

While the preferred embodiments of the invention have been described above, it will be recognized and understood that various modifications may be made therein, and the appended claims are intended to cover all such modifications which may fall within the spirit and scope of the invention.

TABLE 1

Results from Analysis of Asian and Canadian Barley Cultivars
Waxy cultivars are presented in blue

| Origin | Cultivar | β-Glucan[1,2] db (%) | Total Dietary Fibre[2] (%) | Amylose[3] (%) | SSV[3,4] | DSC[3,5] H (J/g) | Tortilla Extensibility[6] | |
|---|---|---|---|---|---|---|---|---|
| | | | | | | | Area (g/sec) | Peak Force (g) |
| Asian | Akashinriki-1 | 5.67 | 19.2 | 29.1 | 4.29 | 2.676 | 2191 | 294 |
| Asian | Akashinriki-2 | 5.92 | 18.9 | 30.7 | 4.29 | 2.495 | 2132 | 276 |
| Asian | Chuanhio #2 | 5.76 | 16.6 | 30.5 | 4.72 | 2.239 | 2150 | 217 |
| Asian | Hokulo Hadaka | 4.27 | 19.5 | 29.1 | 4.59 | 2.435 | 2494 | 217 |
| Asian | Kara Maruini-1 | 5.04 | 18.9 | 29.4 | 4.19 | 2.668 | 2584 | 298 |

TABLE 1-continued

Results from Analysis of Asian and Canadian Barley Cultivars
Waxy cultivars are presented in blue

| Origin | Cultivar | β-Glucan[1,2] db (%) | Total Dietary Fibre[2] (%) | Amylose[3] (%) | SSV[3,4] | DSC[3,5] H (J/g) | Tortilla Extensibility[6] Area (g/sec) | Tortilla Extensibility[6] Peak Force (g) |
|---|---|---|---|---|---|---|---|---|
| Asian | Kinai Nidahadaka | 4.96 | 19.7 | 29.7 | 4.32 | 2.438 | 2623 | 330 |
| Asian | Kinai Kyosh-2 | 5.52 | 20.9 | 28.9 | 4.92 | 2.346 | 2521 | 374 |
| Asian | Kobai Sai-1 | 5.31 | 19.8 | 31.0 | 4.82 | 2.520 | 2605 | 368 |
| Asian | Kodarna-10 | 5.33 | 19.9 | 29.8 | 4.52 | 2.589 | 2132 | 255 |
| Asian | Kyoto Yane-1 | 4.82 | 18.9 | 28.0 | 4.62 | 2.789 | 2434 | 323 |
| Asian | Mimaidi-14 | 5.22 | 17.7 | 26.0 | 4.85 | 2.320 | 2324 | 327 |
| Asian | Mitsa Kiko-1 | 4.70 | 18.3 | 28.1 | 4.68 | 2.483 | 2571 | 382 |
| Asian | Nara Hakumai-1 | 5.38 | 17.6 | 29.6 | 4.32 | 2.281 | 2109 | 296 |
| Asian | Osaka Yakka-52 | 5.14 | 18.6 | 28.2 | 4.72 | 2.398 | 2540 | 347 |
| Asian | Sanuki Hadaka | 6 29 | 18.6 | 25.0 | 4.85 | 2.094 | 2084 | 299 |
| Asian | Senbon Hadaka | 5.50 | 19.2 | 29.0 | 4.39 | 2.387 | 1892 | 277 |
| Asian | Shiga Waseh-6 | 5.63 | 19.4 | 31.0 | 4.72 | 2.565 | 1952 | 255 |
| Asian | Shina Waju | 7.00 | 21.0 | 4.0 | 11.80 | 0.248 | 9793 | 1077 |
| Asian | Shin Shinriki-1 | 5.36 | 18.6 | 26.6 | 4.69 | 2.545 | 2240 | 328 |
| Asian | Torie 2 Jypu | 4.85 | 20.7 | 28.4 | 3.99 | 2.656 | 2006 | 288 |
| Canadian | Hawkeye | 3.92 | 14.6 | 27.1 | 4.52 | 1.766 | 2614 | 405 |
| Canadian | Falcon | 4.87 | 15.5 | 27.9 | 4.19 | 2.227 | 2183 | 291 |
| Canadian | CDC Candle | 5.26 | 16.4 | 5.1 | 12.00 | 0.393 | 5453 | 617 |
| Canadian | CDC-92-55-09-21 | 7.93 | 19.7 | 35.9 | 2.79 | 2.965 | 2287 | 351 |
| Canadian | S8 93977 | 6.84 | na | 3.3 | 11.31 | 0.373 | 7115 | 753 |
| Canadian | CDC-92-55-06-54 | 6.43 | 21.6 | 37.9 | 2.83 | 2.739 | 2223 | 345 |
| Canadian | S8 94893 | 7.70 | na | 41.2 | 2.53 | 3.355 | na | na |
| Canadian | CDC Alamo | 6.90 | 17.7 | 0 | 11.84 | 0 | 4925 | 682 |
| Canadian | S8 94917 | 7.48 | na | 4.3 | 12.00 | 0.513 | 4796 | 656 | na = not applicable (not tested).
[1]Reported on a dry weight basis (db).
[2]Performed on wholemeal.
[3]Performed on starch extracted from grain.
[4]SSV = starch swelling volume.
[5]H = enthalpy of the amylose lipid complex.
[6]Textural properties of tortillas.

What is claimed is:

1. A method of preparing a wrap, tortilla, or tortilla chip comprising:
    providing a quantity of barley flour having 0–20% amylose content;
    combining the barley flour with at least one other ingredient to produce a quantity of dough; and
    using the dough to prepare the wrap, tortilla, tortilla chip.

2. The method according to claim 1 wherein the barley flour is a cultivar selected from the group consisting of CDC Alamo, Shina Waju, CDC Candle, SB 94917 Merlin, Waxbar, Meresse and SB 93977.

3. The method according to claim 1 wherein the barley flour is milled flour.

4. The method according to claim 1 wherein a tortilla is prepared.

5. The method according to claim 1 wherein a tortilla chip is prepared.

6. The method according to claim 1 wherein the at least one other ingredient includes wheat flour.

7. The method according to claim 1 wherein the at least one other ingredient is water.

8. The method according to claim 1 wherein at least 50% of flour is waxy barley flour.

9. The method according to claim 1 wherein at least 75% of flour is waxy barley flour.

10. The method according to claim 1 wherein 100% of flour is waxy barley flour.

11. The method according to claim 1 wherein a wrap is prepared.

* * * * *